United States Patent [19]

Longworth

[11] Patent Number: 4,913,767

[45] Date of Patent: Apr. 3, 1990

[54] CUT OFF BLADE FOR SEVERING MULTIPLE LAYERS OF THIN POLYMERIC SHEET MATERIAL

[75] Inventor: Frederic A. Longworth, St. Paul, Minn.

[73] Assignee: Minnesota Mining and Manufacturing Company, St. Paul, Minn.

[21] Appl. No.: 283,237

[22] Filed: Dec. 12, 1988

[51] Int. Cl.⁴ .............................................. B32B 31/18

[52] U.S. Cl. .................................... 156/527; 156/554; 156/577; 156/579; 83/835; 83/837; 83/846; 83/853; 83/854; 83/855; 225/91

[58] Field of Search ............... 156/510, 527, 554, 577, 156/579; 225/91; 83/835, 837, 846, 853, 854, 855

[56] References Cited

U.S. PATENT DOCUMENTS

| | | | |
|---|---|---|---|
| Re. 30,787 | 11/1981 | Pool et al. | 156/527 |
| 3,510,034 | 5/1970 | Caskey et al. | 225/91 |
| 3,855,892 | 12/1974 | DiLello et al. | 83/835 |
| 3,950,214 | 4/1976 | Pool et al. | 156/554 |
| 4,263,347 | 4/1981 | Banta | 427/282 |
| 4,379,019 | 4/1983 | Pool | 156/527 |
| 4,802,396 | 2/1989 | Kuklinkski | 83/835 |
| 4,588,469 | 5/1986 | Hunter | 156/554 |
| 4,646,956 | 3/1987 | Ruff et al. | 225/91 |
| 4,755,254 | 7/1988 | Bedwell | 156/554 |
| 4,780,172 | 10/1988 | Shea | 156/577 |

*Primary Examiner*—Caleb Weston
*Attorney, Agent, or Firm*—Donald M. Sell; Walter N. Kirn; William L. Huebsch

[57] ABSTRACT

A cut off blade adapted for severing plastic film material folded in layers. The blade is a thin metal sheet including an attachment portion and a plurality of similarly shaped teeth defining a cutting edge portion of the blade. Each of the teeth defines parts of the first and second major surfaces in the shapes of isosceles triangles with two equal length sides terminating in points and having bases adjacent the attachment portion and aligned in a first direction along the blade so that the points project at right angles to the first direction. The angle between any portion of an edge surface of the blade along the cutting edge portion and the second surface when measured in a plane normal to the first direction is the same acute angle, and the metal of the sheet defining the edge surface along the cutting edge has been cold flowed toward the intersection thereof with the second major surface by a punch and die forming method to define a sharp edge at that intersection.

4 Claims, 3 Drawing Sheets

CUT OFF BLADE FOR SEVERING MULTIPLE LAYERS OF THIN POLYMERIC SHEET MATERIAL

TECHNICAL FIELD

This invention relates to cut off blades for cutting sheet material on sheet material dispensing devices.

BACKGROUND

Devices such as those described in U.S. Pat. Nos. Re. 30,787 and 4,379,019 are well known for applying a strip of masking tape along one edge of a sheet of masking material with a portion of the tape extending past the edge of the masking material by which the masking material may be temporarily attached along a surface to be protected, such as during painting of an adjacent surface. Typically such devices include a cut off blade by which the tape and sheet of masking material may be severed after a desired length thereof has been withdrawn from the device.

U.S. Patent application Ser. No. 116,508 entitled "Sheet Material for Masking Apparatus" filed Nov. 2, 1987, describes a roll of thin polymeric masking material intended for use on the type of device described in U.S. Pat. Nos. Re. 30,787 and 4,379,019, which masking material is a wide sheet folded back and forth upon itself to shorten the length of the roll so that after application of the tape to the masking material and to a surface to be masked the sheet of masking material must be unfolded to obtain the benefit of its full width. The cut off blade normally used in that device, however, does not readily cut the multiple layers of such folded polymeric material, particularly when several folds are present (e.g., over 2 folds).

SUMMARY OF THE INVENTION

The present invention provides an economically made cut off blade with a cutting edge portion that is particularly efficient at severing a polymeric sheet of masking material folded in multiple layers.

Generally the cut off blade according to the present invention comprises a thin metal sheet including an attachment portion and a plurality of similarly shaped teeth providing a cutting edge portion of the blade, each of which teeth defines parts of first and second major surfaces of the blade in the shapes of isosceles triangles having bases adjacent the attachment portion and aligned in a first direction along the blade so that points of the triangular surface parts project at right angles to the first direction. The sides of adjacent surface parts intersect at the bases of the adjacent parts to define a generally V shaped opening between the adjacent parts. The angle between the second surface and any portion of the edge surface along the cutting edge portion when measured in a plane normal to the first direction is the same acute angle in the range of 15 to 45 degrees and preferably 30 degrees, and the metal of the sheet at the edge surface along the cutting edge portion of the blade has cold flowed toward the intersection thereof with the second major surface to define a very sharp edge at that intersection. Also, the distance between the points on adjacent ones of the teeth is in the range of 0.1 to 0.32 centimeter (0.04 to 0.125 inch) and preferably 0.23 centimeter (0.09 inch); the dimension between the point and the base on each tooth is in the range of 0.25 to 0.5 centimeter (0.1 to 0.2 inch) and preferably 0.33 centimeter (0.129 inch); and the included angle at said points between said equal length sides is in the range of 30 to 45 degrees and preferably about 38 and one half degrees to provide teeth that with easily applied manual force can pierce multiple layers of polymeric sheet material (e.g., up to 24 layers) to prevent any of the layers from slipping on the cutting edge, and can then progressively cut through the layers to complete the cut.

BRIEF DESCRIPTION OF DRAWING

The present invention will be further described with reference to the accompanying drawing wherein like reference numerals refer to like parts in the several views, and wherein.

DETAILED DESCRIPTION

Figure 1:
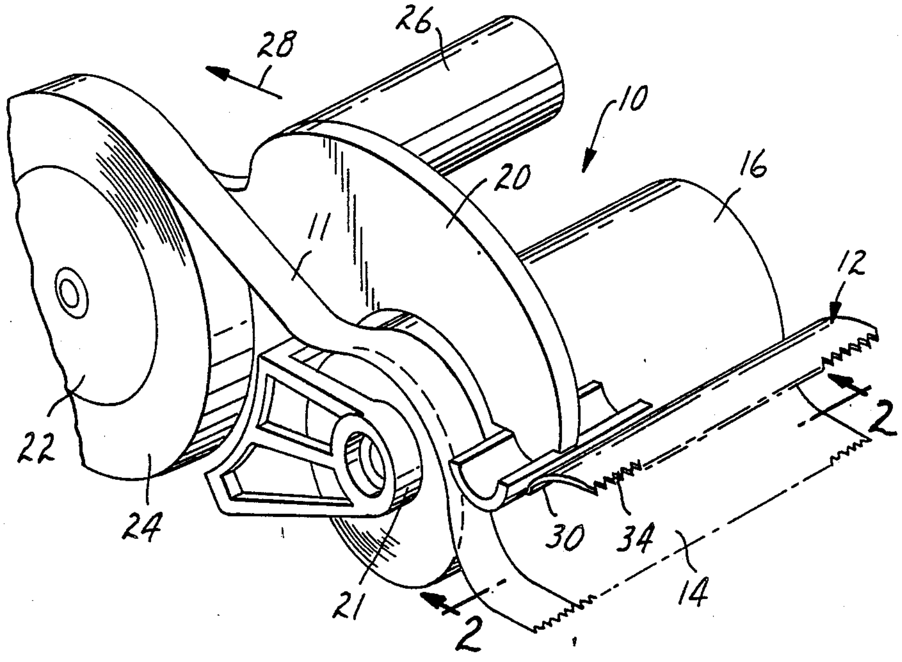
FIG. 1 is a fragmentary perspective view of a masking device of the type described in U.S. Pat. No. 4,379,019 including a cut of blade according to the present invention, on which device are mounted a roll of masking tape and a roll of coiled and folded sheet material.

Referring now to FIG. 1 there is illustrated a masking device 10 for dispensing lengths of sheet masking material 14 having lengths of pressure sensitive adhesive tape 11 applied along one edge portion 15 thereof. The device 10 is generally of the type described in U.S. Pat. No. 4,379,019 (the content whereof is incorporated herein by reference) except that it includes a cut off blade 12 according to the present invention. The cut off blade 12 is particularly adapted for severing thin polymeric sheet masking material 14 that has been longitudinally folded and rolled into a roll 16 so that, as seen in FIG. 2, several (as illustrated 5) layers 18 of the masking material 14 must be severed by the cut off blade 12 after a predetermined taped length of the folded masking material 14 has been dispensed.

The masking device 10 includes a frame 20, a first holder 21 rotatably mounted on the frame 20 and supporting the roll 16 of longitudinally folded and coiled sheet masking material 14, a second holder 22 rotatably mounting on the frame 20 and supporting a conventional roll 24 of the masking tape 11 which tape 11 has an end portion extending onto the edge portion 15 of the outermost wrap of the masking material 14, and a handle 26 by which the device 10 may be manually manipulated. As the device 10 is moved in the direction indicated by the arrow 28, the masking material 14 and the tape 11 are progressively uncoiled as the tape 11 is applied to the edge portion 15 of the masking material 14 by the device 10, and when the desired length of combined masking material 14 and tape 11 has been dispensed, the cut off blade 12 can be manually moved to a position to sever both the tape 11 and the masking material 14.

While use of the cut off blade 12 is illustrated on the device 10 which is of the type usually referred to as a hand held masking machine, the blade 12 could also be used on a normally stationary device of the type commonly referred to as an apron taper which can also apply lengths of masking tape along the edge portion of longitudinally folded polymeric sheet masking material, and on which, when the desired length of combined masking material and tape has been pulled away, the combined masking material and tape can be manually moved into engagement with the cutting blade 12 to sever both the tape and the masking material.

Figure 2:
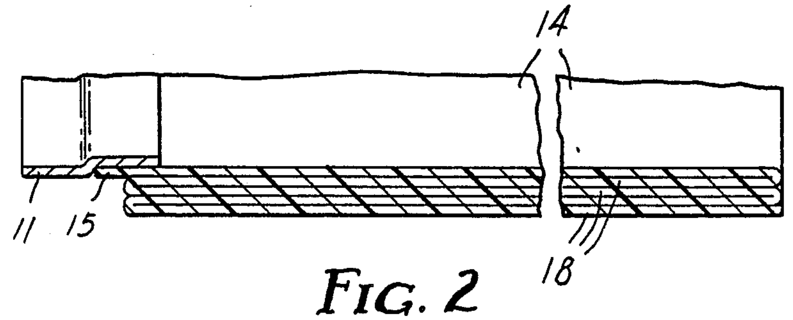
FIG. 2 is an enlarged sectional view taken approximately along the line 2—2 of FIG. 1.
Figure 3:
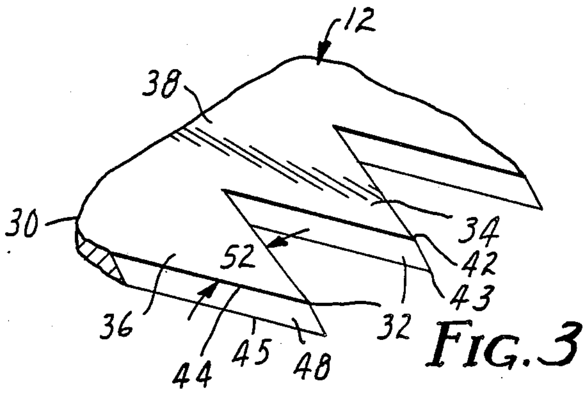
FIG. 3 is an enlarged fragmentary perspective view of the cut off blade shown in FIG. 1.
Figure 4:
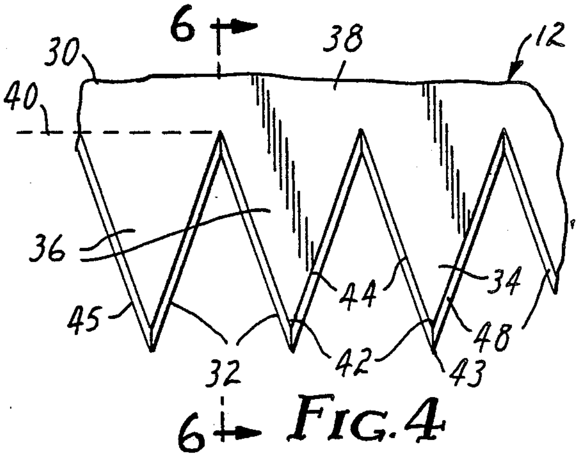
FIG. 4 is an enlarged fragmentary top view of the cut off blade shown in FIG. 1.
Figure 5:
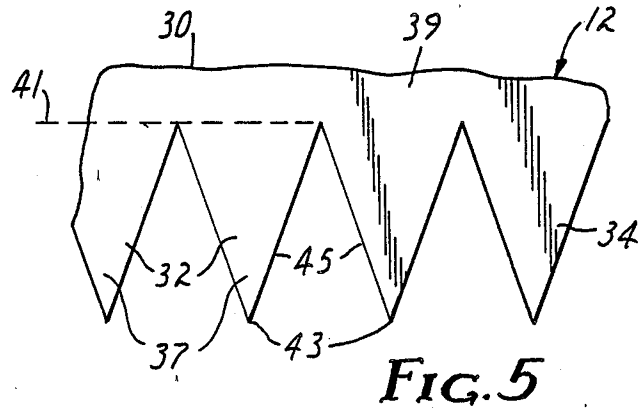
FIG. 5 is an enlarged fragmentary bottom view of the cut off blade shown in FIG. 1.
Figure 6:
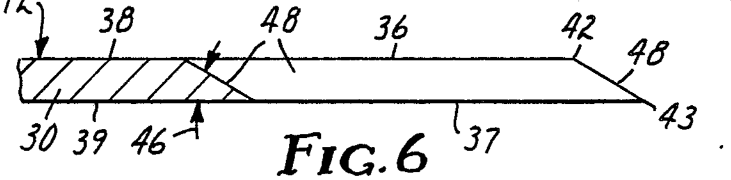
FIG. 6 is a sectional view taken approximately along the line 6—6 of FIG. 4.

With reference to FIG. 2, it is seen that the longitudinally folded and coiled sheet masking material 14 of roll 20 is folded to provide the many layers 18 or pleats of the masking material 14 that must be held and severed by the cut off blade 12. The thickness of the layers 18 seen in FIG. 2 is greatly exaggerated for purposes of illustration. Preferably, the sheet masking material 14 is a relatively thin plastic film such as polyethylene having a thickness in the range of 0.0002 inch to 0.0400 inch, with a preferred thickness being about 0.0004 inch.

FIGS. 3–6 illustrate details of the cut off blade 12 according to the present invention that is particularly useful for cutting longitudinally folded polymeric sheet masking material 14 of the type described above. The cut off blade 12 comprises an elongate thin metal sheet (e.g., in the range of 0.025 to 0.15 centimeter (0.01 to 0.06 inch) and preferably 0.048 centimeter (0.019 inch) thick stainless steel) including an arcuate attachment portion 30 having a plurality of openings by which the blade 12 is removably and adjustably attached to the device 10, and a plurality of similarly shaped teeth 32 providing a cutting edge portion 34 of the blade 12. Each of the teeth 32 defines generally opposite parts 36 or 37 respectively of first and second major surfaces 38 and 39 of the blade 12, which parts 36 or 37 are in the shapes of isosceles triangles having bases (identified by imaginary lines 40 and 41 in FIGS. 4 and 5 respectively) adjacent the attachment portion 30 and aligned in a first direction longitudinally along the blade 12 so that points 42 or 43 of the triangular surface parts 36 or 37 project at right angles to the first direction. Equal length sides 44 or 45 of adjacent surface parts 36 or 37 intersect at the bases of the adjacent surface parts 36 or 47 to define a generally V shaped opening between the adjacent surface parts 36 or 37. The angle 46 (see FIG. 6) between the second major surface 39 adjacent the teeth 32 and any portion of an edge surface 48 between the major surfaces 38 and 39 and along the cutting edge portion 34 when measured in a plane normal to the first direction in which the bases of the surface parts 36 or 37 are aligned is the same acute angle in the range of 15 to 45 degrees and is preferably 30 degrees, and the metal of the sheet defining the edge surface 48 along the cutting edge portion 34 of the blade 12 has cold flowed toward the intersection thereof with the second major surface 39 to define a very sharp edge at that intersection. Also, the distance between the points 42 or 43 on adjacent ones of the teeth 32 is in the range of 0.1 to 0.32 centimeter (0.04 to 0.125 inch) and preferably 0.23 centimeter (0.09 inch); the tooth depth or minimum dimension between the point 42 or 43 and the base 40 or 41 on each tooth 32 is in the range of 0.25 to 0.5 centimeter (0.1 to 0.2 inch) and preferably 0.33 centimeter (0.129 inch); and the included angle 52 (see FIG. 3) at the point 42 or 43 between the equal length sides 44 or 45 is in the range of 30 to 45 degrees and preferably about 38 and one half degrees to provide teeth 32 that, with easily applied manual force, can pierce the multiple layers 18 of the polymeric sheet masking material 14 (e.g., up to 24 layers) to prevent any of the layers 18 from slipping on the cutting edge portion 34, and can then progressively cut through the layers 18 to complete the cut.

The triangular surface parts 36 and 37 on each tooth 32 are parallel and have the same size and shape, and any planar section through a tooth 32 and parallel to the surface parts 36 and 37 also has the same size and shape as the surface parts 36 and 37. That shape includes two equal length sides (i.e., an isosceles triangle) terminating in a slightly rounded leading tip and forming a slightly rounded juncture with adjacent teeth 32.

Figure 7:
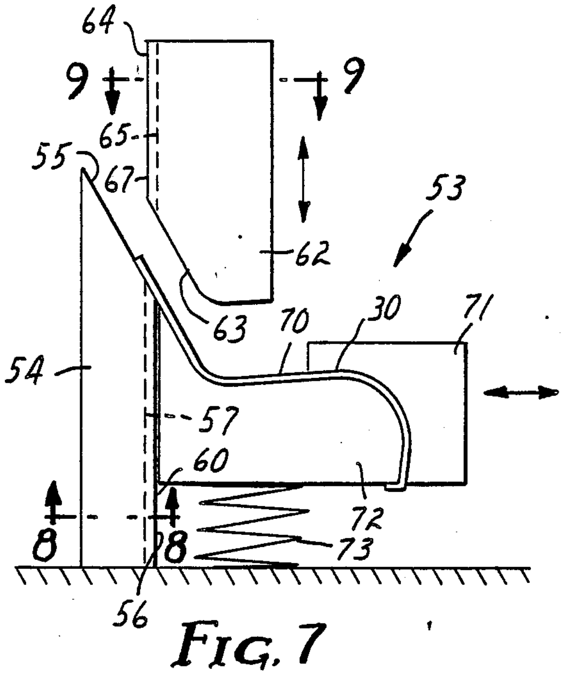
FIG. 7 is an end view of a punch and die assembly by which the cut off blade of FIG. 1 may be formed.
Figure 8:
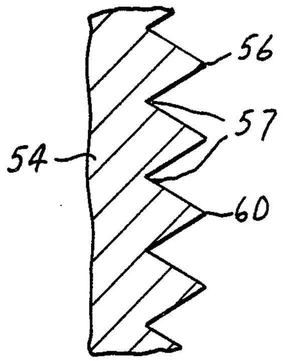
FIG. 8 is a sectional view taken approximately along the line 8—8 of FIG. 7.
Figure 9:
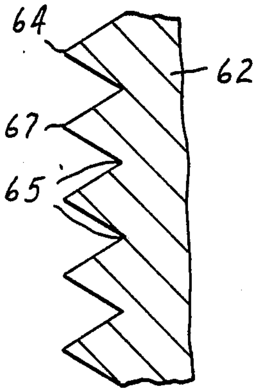
FIG. 9 is a sectional view taken approximately along the line 9—9 of FIG. 7.

While a cut off blade having a cutting edge portion with the shape described above could be made by grinding or by conventional or electrical discharge machining, a particularly economical method of manufacture using a punch and die assembly 53 illustrated in FIG. 7 which can produce the cutting edge portion 34 includes (1) providing a die 54 having intersecting support and side surfaces 55 and 56, a plurality of adjacent, parallel, generally V shaped grooves 57 (see FIG. 8) along the side surface 56 which grooves 57 are disposed normal to the intersection between the support and side surfaces 55 and 56, have ends opening through the support surface 55, and define adjacent, parallel, forming ridges 60 along the side surface 56 and having ends along the support surface 55, the support surface 55 adjacent the ends of the ridges 60 being disposed at an obtuse included angle in the range of about 135 to 165 degrees with respect to the side surface 56; (2) providing a punch 62 having intersecting leading and working surfaces 63 and 64, a plurality of adjacent, parallel, generally V shaped grooves 65 (see FIG. 9) along the working surface 64, disposed normal to the intersection between the leading and working surfaces 63 and 64, having ends opening through the leading surface 63, and defining adjacent, parallel, forming ridges 67 along the working surface 64 which are complementary to the forming ridges 60 of the die 54 and have ends along the leading surface 63; (3) positioning a portion of a blank 70 on which the cutting edge portion 34 is to be formed along the support surface 55 of the die 54 with a part of the blank 70 projecting over the ends of the grooves and ridges 57 and 60 along the support surface 55; and (4) cutting away the part of the blank 70 projecting over the ends of the ridges 60 grooves and along the support surface 55 by causing relative movement between the die 54 and the punch 62 longitudinally of the forming ridges 60 and 67 to move the ends of the forming ridges 67 on the leading surface 63 of the punch 62 into the ends of the grooves 57 along the support surface 55 of the die 54.

As illustrated in FIG. 7, the portion of the blank 70 on which the cutting edge portion 34 is tö be formed to be formed in the manner described above is preferably positioned along the support surface 55 of the die 54 by first positioning the attachment portion 30 of blank 70 (which has already been formed in an arc) on a support portion 72 of the assembly 53 to which the blank 70 may be clamped by a clamp 71. The support portion 72 is mounted on springs 73 for movement relative to the die 54 from an upper position (illustrated in FIG. 7) at which it supports the blank 70 above the support surface 55, toward lower positions to which it is moved by the leading surface 63 of the punch 62 acting through the blank 70 which sequentially causes the portion of the blank 70 on which the cutting edge portion 34 is to be formed to contact the support surface 55, to then be cut, and the completed blade 17 to then move below the support surface 55 with the leading surface 63 of the punch 62. Upon withdrawal of the punch 62 from engagement with the die 54, the springs 73 will then return the support portion 72 carrying the completed blade 17 to its upper position affording removal of the blade 17 and positioning of a new blank 70 in the punch and die assembly 53.

Because of the obtuse included angle between the support surface 55 and the side surface 56 of the die 54 (which is a complement to the angle 46 between the edge surface 48 and the second major surface 39 of the blade 12) the forming ridges 60 and 67 cut teeth 32 that are deeper than the grooves 57 and 65 and have sharper angles 52 than the the angles defined between the sides of the ridges 60 and 67. For example, for the preferred included angle 52 of 38 and one half degrees, a tooth depth of 0.328 centimeter (0.129 inch) and an angle 46 of 30 degrees, the included angle defined by the sides of the forming ridges 60 and 67 will be 62 degrees and the depth of the forming ridges 60 and 67 will be about 0.19 centimeter (0.075 inch). For a blank 70 of No. 301 sheet steel, half hard and 0.046 centimeter (0.018 inch) thick, a clearance between side and working surfaces 56 and 64 of the die and punch 54 and 62 of about 0.0025 centimeter (0.001 inch) is appropriate.

Forming the cutting edge portion 34 by the method described above, which is more of a broaching than a shearing process, causes the metal in the blank 70 to cold flow along the edge surface 48 toward the juncture of the edge surface 48 with the second major surface 39, which cold flow results in a sharp, burr free, cutting edge at that juncture which is particularly well adapted for severing multiple layers of polymeric film. Such cold flow is typically not found on edge surfaces sheared at angles close to 90 degrees with respect to the major surfaces of the blank, which shearing more typically result in about $\frac{1}{3}$ cutting and $\frac{2}{3}$ breaking of the blank along the edge surface formed.

The present invention has now been described with reference to one embodiment and some modifications thereof. It will be apparent to those skilled in the art that many changes can be made in the embodiment described without departing from the scope of the present invention. Thus the scope of the present invention should not be limited to the structures described in this application, but only by structures described by the language of the claims and the equivalents of those structures.

I claim:

1. A device from which lengths of sheet masking material having lengths of pressure sensitive adhesive tape applied along and projecting beyond one edge portion thereof may be dispensed, said device including a frame a first holder rotatably mounted on said frame and adapted to support a roll of sheet masking material, a second holder rotatably mounting on the frame and adapted for supporting a roll of masking tape with the tape having an end portion extending onto an edge portion of the outermost wrap of the masking material, means for guiding the tape into engagement with the edge portion of the masking material as the masking material and tape are withdrawn from the device, and a cut off blade mounted on the frame adapted to engaged the tape and masking material to sever a withdrawn portion thereof from the tape and masking material on the device, wherein said cut off blade is particularly adapted for severing thin polymeric sheet masking material that has been longitudinally folded and rolled into a said roll so that several layers of the masking material must be severed by the cut off blade after a predetermined taped length of the masking material has been withdrawn, said cut off blade comprising a thin metal sheet having opposite first and second major surfaces and edge surfaces between said first and second major surfaces, said metal sheet including an attachment portion mounted on said frame and a plurality of similarly shaped teeth defining a cutting edge portion of said cut off blade, each of which teeth defines parts of said first and second major surfaces in the shapes of isosceles triangles with two equal length sides terminating in points and having bases adjacent said attachment portion and aligned in a first direction along said blade so that said points project at right angles to said first direction, the sides of adjacent parts intersecting at the bases of the adjacent parts to define a generally V shaped opening between said adjacent parts, the angle between any portion of said edge surface along said cutting edge portion and said second major surface when measured in a plane normal to said first direction being the same acute angle in the range of 15 to 45 degrees, the metal of said sheet at said edge surface along said cutting edge portion having cold flowed toward the intersection thereof with said second major surface to define a sharp edge at said intersection, the distance between said points on adjacent ones of said teeth being in the range of 0.1 to 0.32 centimeter (0.04 to 0.125 inch); the dimension between said point and said base on each of said teeth being in the range of 0.25 to 0.5 centimeter (0.1 to 0.2 inch); and the included angle at said points between said equal length sides being in the range of 30 to 45 degrees so that with a moderate amount of force applied between the teeth and the several layers of masking material the teeth can pierce the several layers of masking material to hold them in place and subsequently sever the layers.

2. A device according to claim 1 in which the distance between said points on adjacent ones of said teeth is about 0.23 centimeter (0.09 inch); the dimension between said point and said base on each of said teeth is about 0.33 centimeter (0.129 inch); the included angle at said points between said equal length sides is about 38 and one half degrees; and said same acute angle is about 30 degrees.

3. A cut off blade adapted for severing several layers of plastic film material, said cut off blade comprising a thin metal sheet having opposite first and second major surfaces and edge surfaces between said major surfaces, said metal sheet including an attachment portion and a plurality of similarly shaped teeth defining a cutting edge portion of said cut off blade, each of which teeth defines parts of said first and second major surfaces in the shapes of isosceles triangles with two equal length sides terminating in points and having bases adjacent said attachment portion and aligned in a first direction along said blade so that said points project at right angles to said first direction, the sides of adjacent parts intersecting at the bases of the adjacent parts to define a generally V shaped opening between said adjacent parts, the angle between any portion of said edge surface along said cutting edge portion and said second major surface when measured in a plane normal to said first direction being the same acute angle in the range of 15 to 45 degrees, and the metal of said sheet at said edge surface along said cutting edge having cold flowed toward the intersection thereof with said second major surface to define a sharp edge at said intersection, the distance between said points on adjacent ones of said teeth being in the range of 0.1 to 0.32 centimeter (0.04 to 0.125 inch); the dimension between said point and said base on each of said teeth being in the range of 0.25 to 0.5 centimeter (0.1 to 0.2 inch); and the included angle at said points between said equal length sides being in the range of 30 to 45 degrees so that with a moderate amount of force applied between the teeth and the several layers of material the teeth can pierce the several layers of material to hold them in place and subsequently sever the layers.

4. A blade according to claim 3 in which the distance between said points on adjacent ones of said teeth is about 0.23 centimeter (0.09 inch); the dimension between said point and said base on each of said teeth is about 0.33 centimeter (0.129 inch); the included angle at said points between said equal length sides is about 38 and one half degrees; and said same acute angle is about 30 degrees.

* * * * *